UNITED STATES PATENT OFFICE.

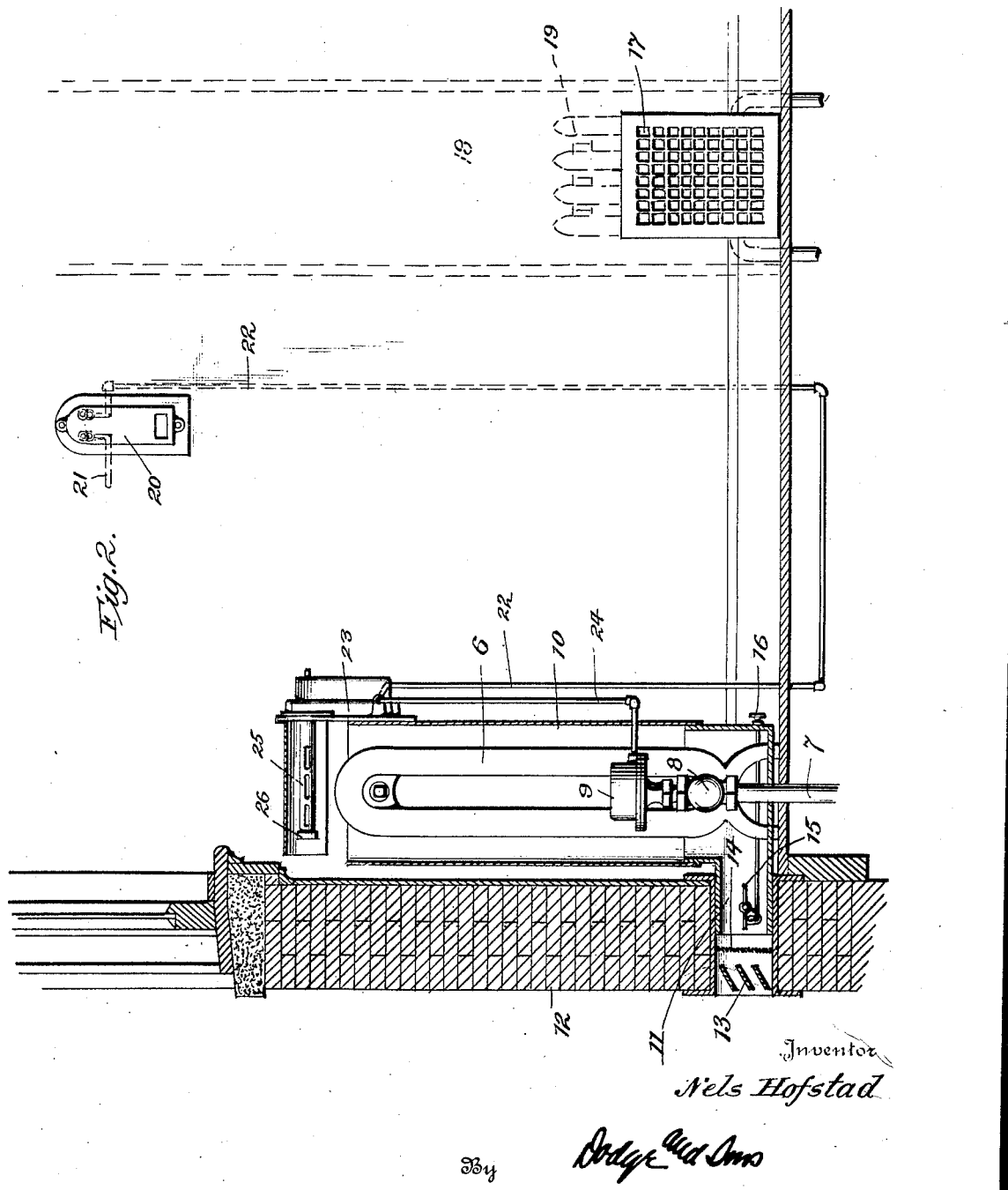

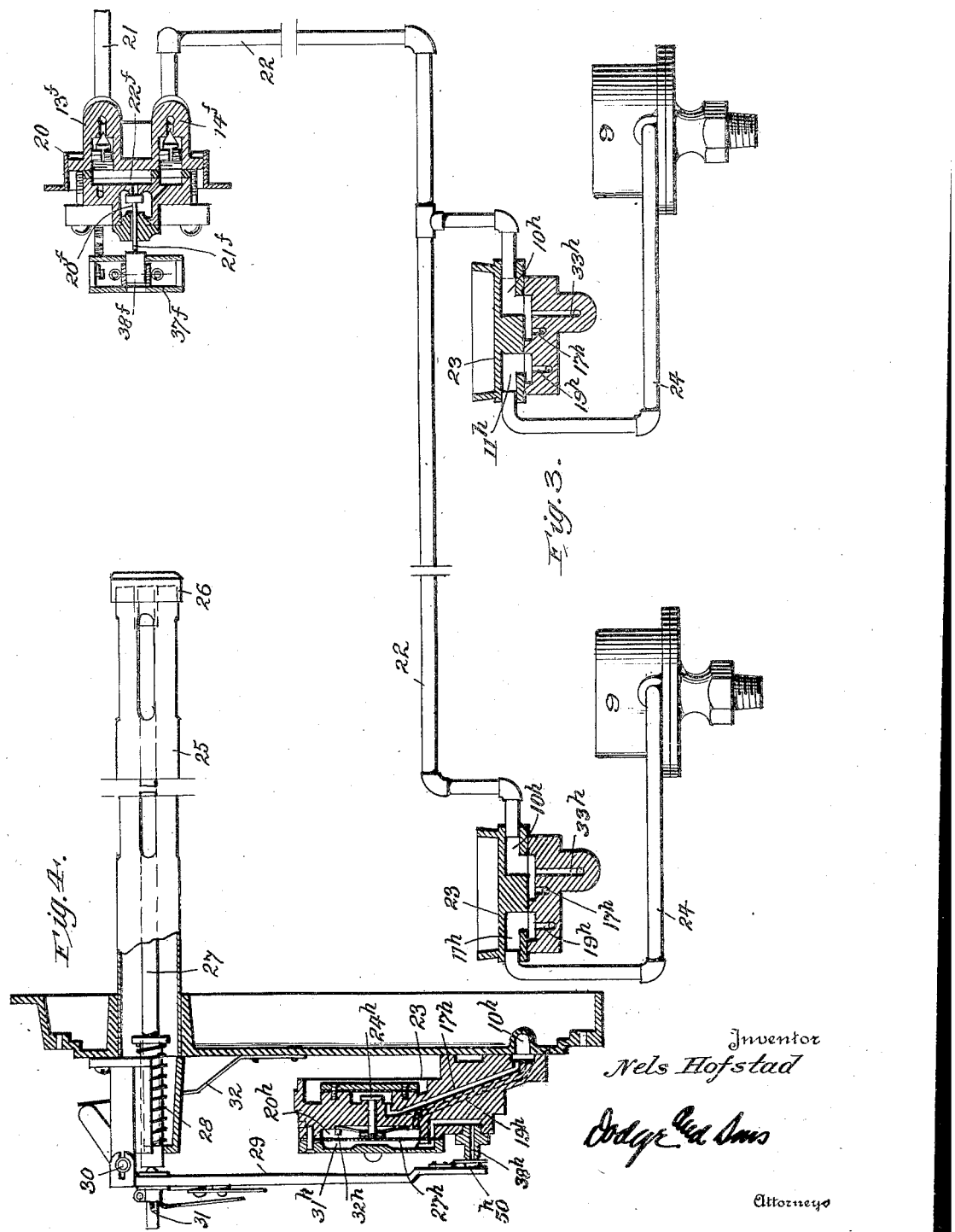

NELS HOFSTAD, OF CHICAGO, ILLINOIS, ASSIGNOR TO JOHNSON SERVICE COMPANY, OF MILWAUKEE, WISCONSIN, A CORPORATION OF WISCONSIN.

APPARATUS FOR THERMOSTATIC CONTROL.

1,417,738.                     Specification of Letters Patent.     Patented May 30, 1922.

Application filed March 18, 1921. Serial No. 453,338.

*To all whom it may concern:*

Be it known that I, NELS HOFSTAD, a citizen of the United States, residing at Chicago, in the county of Cook and State of Illinois, have invented certain new and useful Improvements in Apparatus for Thermostatic Control, of which the following is a specification.

This invention relates to temperature control, and particularly apparatus for the control of temperature of rooms equipped with so-called direct-indirect heating and ventilating systems.

It has heretofore been found impossible to control such systems satisfactorily by means of a room thermostat, of any type, for the reason that when the thermostat shuts down the heating element, cold air enters and flowing to the floor does not affect the thermostat until the room is unduly chilled. This leads to wide periodic fluctuations of temperature. There is need for some type of thermostatic control device, responsive to room temperature, and not subject to the difficulty above set forth.

I have accomplished the desired result by the use of two related thermostats. One of these is of the so-called "intermediate type" a term used by manufacturers to designate thermostats which exert a progressive or varying effect in accord with progressive temperature variations, and the other is of the "positive type," a term used to designate a thermostat which merely renders a controlled mechanism fully active or entirely inactive when the temperature varies past a chosen critical value.

The intermediate thermostat is subject to the temperature of the heated air as this is discharged from the ventilating duct, and operates upon increase of temperature to reduce the heating effect of the heating element which heats air entering through that duct. This action being progressive, the intermediate thermostat functions to maintain the temperature of the heated air substantially constant.

The positive thermostat is subject to room temperature, and functions whenever the room temperature falls below the chosen critical value to cause the heating element to operate at increased and preferably at its full effect, despite any regulative tendency of the intermediate thermostat. When room temperature is at or above the normal (critical) value, the positive thermostat allows the intermediate thermostat to assume control of the heating element.

This general effect can be secured in a variety of specifically different ways. Various different types of positive and intermediate thermostats may be used and they must be differently connected according to their specific operative characteristics. All such installations, however, present the following important general characteristics; the heating element is in the room and heats by direct radiation to the room as well as heating the incoming air; at normal and higher room temperatures the heating element is controlled by an intermediate thermostat subject to the temperature of the heated air as this leaves the ventilating duct; at subnormal room temperatures the heating element is operated at an increased, and preferably its full heating rate, through the action of a positive thermostat subject to room temperature.

Particular advantages of the system are that one room thermostat may control several heating and ventilating units, each having a corresponding intermediate thermostat, putting them into and out of action simultaneously. Conditions in one room do not in any way affect the action of the control mechanism in another room, as each heating, ventilating and control set is complete, and self-contained.

Pneumatic thermostats lend themselves well to the performance of the desired functions, and are preferred by me. I have successfully used a positive thermostat of the type described and claimed in patent to Fortier No. 1,212,042, January 9, 1917, in combination with an intermediate thermostat of the type described and claimed in my reissue Patent No. 14,671, June 24, 1919, to control a normally active heating element. The positive thermostat acts on a fall of room temperature below the critical value to cut off motive air from the intermediate thermostat and vent the system. This puts the intermediate thermostat wholly out of action and allows the heating element to assume its normal or full heating effect. When room temperature rises to or above the critical value the positive thermostat admits motive air to the intermediate thermostat restoring it to action. The intermediate thermostat then functions to maintain the incoming air constantly at or near the desired normal room temperature, and continues this action indefinitely unless the temperature again becomes subnormal and the positive thermostat, as a consequence, operates to arrest its action.

I illustrate such an installation in the accompanying drawings, in which,—

Fig. 2 is a view of the same, on an enlarged scale, looking to the right (with reference to Fig. 1). Certain parts are shown in section.

Fig. 3 is a diagram, partly in section showing one positive thermostat connected according to my invention to control simultaneously a plurality of intermediate thermostats, one for each of a plurality of direct-indirect heating units furnishing heat and heated air to a single room.

Fig. 4 is a sectional view of an intermediate thermostat of the insertion type, preferred by me, for use in systems embodying the present invention.

Figure 1:
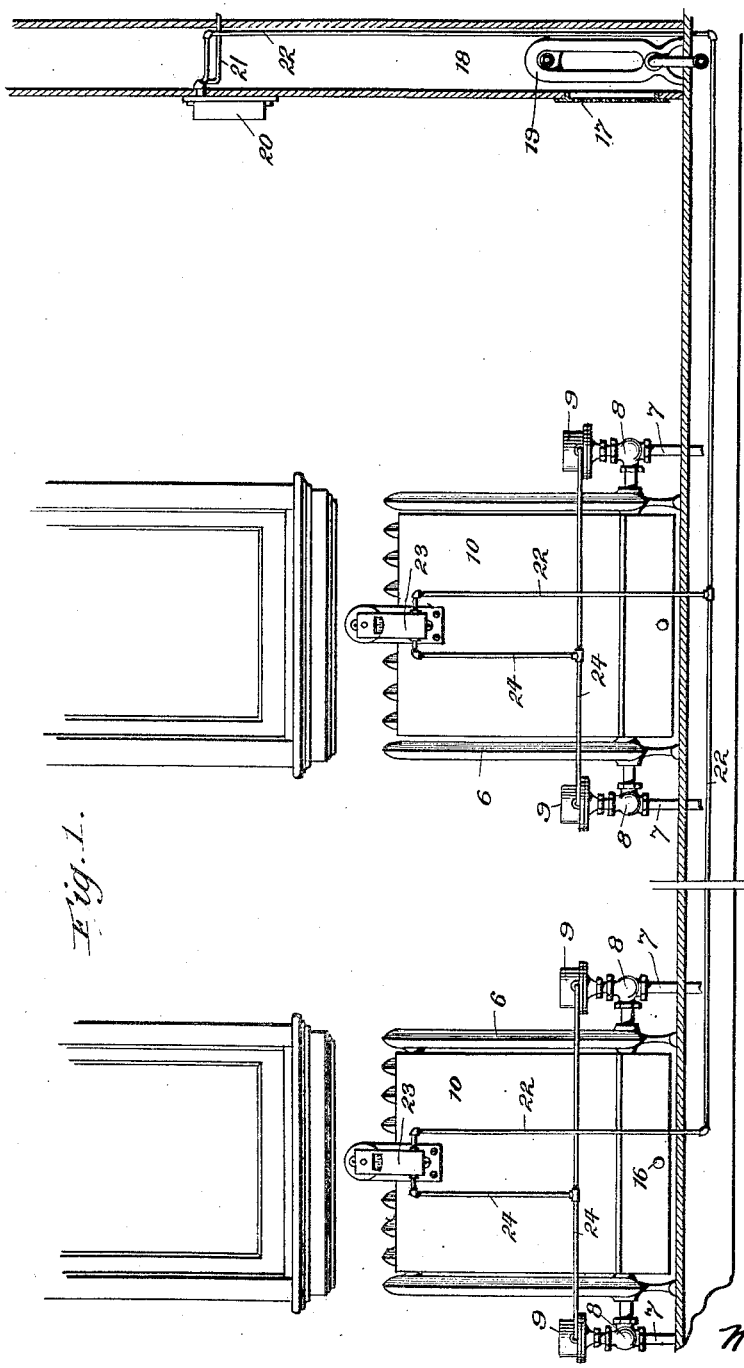
Fig. 1 is a general view, partly in elevation and partly in section of a room having two direct-indirect heating units controlled according to the present invention.

Each heating element consists of a radiator 6 connected to steam pipes 7 through valves 8 which are operated by diaphragm motors 9. Such motor operated valves are well known and each consists essentially of a normally open valve which may be forced closed against spring resistance by fluid pressure acting on a metallic bellows or diaphragm. Devices of this type being familiar to those skilled in the art I deem it unnecessary to illustrate details of this construction.

The middle coils of each radiator 6 are enclosed in a vertical sheet metal duct 10, open at the top and receiving air from out of doors through a passage 11 formed through wall 12. The duct 11 has louvers 13, screen 14 and damper 15, the damper 15 being manually adjustable by means of rod 16. The radiator 6 operates by direct radiation from its exposed end coils to heat the room. The coils within duct 10 draw air from out of doors, at a rate controllable by damper 15, heat this air, and discharge it into the room through the upper end of duct 10.

Air is discharged from the room through a register 17 to a ventilating eduction flue 18. Flow in flue 18 is accelerated and back draft prevented by a steam radiator 19 whose action is not subjected to automatic control.

A positive thermostat 20 is mounted on the wall in the room heated by radiator 6. This thermostat 20 is preferably constructed according to Fortier Patent No. 1,212,042. Its air inlet side is connected to air pressure supply pipe 21 and its controlled side to control pipe 22 which leads to the air inlet side of intermediate thermostat 23. The thermostat 23 is preferably constructed according to Hofstad Reissue Patent No. 14,671, but the responsive element is slightly modified to permit it to extend across the discharge end of duct 10. The controlled side of thermostat 23 is connected by pipe 24 to diaphragm motors 9 which actuate valves 8. The thermostats 20 and 23 are thus in effect connected in series with each other, between air supply pipe 21 and diaphragm motors 9. Thermostat 20 operates to admit and vent pressure fluid to and from the inlet side of thermostat 23, and when subjected to air pressure on its inlet side, thermostat 23 serves to establish a controlled variable pressure on motor 9 to close more or less the radiator valve 8.

The above connections are shown more in detail in Fig. 3. In this figure only one diaphragm motor 9 is shown controlled by each intermediate thermostat, instead of two as in Figs. 1 and 2. The number of motors 9 required depends solely on the nature of the heating system and is not a feature of the invention.

The thermostat 20 is illustrated in Fig. 3 by a section corresponding to Fig. 3 of the Fortier patent above identified. To simplify explanation, I use to indicate parts of the Fortier thermostat, reference numbers identical with those used in that patent but distinguished by the subscript "f". The responsive element, leak port and diaphragm motor forming part of the Fortier thermostat operate to shift pilot valve $20^f$ back and forth between supply and exhaust position, through the quick-throw mechanism $37^f$, $38^f$. The valve $20^f$ is shown in Fig. 3 in exhaust position, the position assumed when room temperature is below normal. Pipe 22 then is connected to atmosphere via $14^f$ and the port around stem $21^f$. When the room temperature reaches normal, or is above normal, valve $20^f$ shifts to close the exhaust port around stem $21^f$ and establishes communication between pipes 21 and 22 via $13^f$, $22^f$ and $14^f$. The first of these positions renders thermostat 23 inactive, and the second renders it active.

The thermostat 23 is shown in Fig. 3 by a transverse section showing the main ports and in Fig. 4 by a section taken in the same plane as Fig. 3 of the Hofstad patent but looking in a relatively opposite direction. Similar parts to those shown in the Hofstad patent are similarly numbered with the subscript "h". The valve $50^h$ is the same in form and function as valve 50 of the patent but is actuated by a different thermally responsive element. The present thermally responsive element consists of a brass tube 25 mounted in the base plate and closed at its rear end by thimble 26. The glass rod 27 is held by thrust spring 28 against thimble 26 and the tube and rod operate by their differential expansion to rock lever 29 about its pivot 30. An adjustable thrust screw 31 forms the connection between rod 27 and lever 29, engagement being maintained by spring 32. The thrust screw by shifting lever 29 relatively to rod 27 adjusts the effect of the thermally responsive element on valve $50^h$. The above described parts are functionally equivalent to the thermally responsive element of the Hofstad patent, the change of structure being merely to permit the thermally responsive tube 25 and rod 27 to project rearwardly across duct 10.

A rise in temperature of the heated air causes valve $50^h$ to move toward leak port $38^h$. When pressure fluid is being supplied to thermostat 23 through pipe 22 connected to port $10^h$ and thence through restricted port $33^h$ to chamber $31^h$ such movement of valve $50^h$ tends to increase the pressure acting in the chamber $31^h$ at the left side of diaphragm $27^h$. Diaphragm $27^h$ valve $24^h$ and exhaust port $32^h$ operate as a pressure regulating valve to maintain a substantially equal opposing pressure in chamber $20^h$ at the right of diaphragm $27^h$. (The necessary supply of pressure fluid for this reaches valve $24^h$ through port $17^h$). Since chamber $20^h$ is connected by port $19^h$ port $11^h$ and pipe 24 to diaphragm motor 9 this motor moves progressively in response to progressive movements of valve $50^h$, and the radiator valve is closed gradually in response to gradual rise of temperature of air in duct 10. A fall of temperature would have the reverse effect, pressure from motor 9 being vented through $32^h$.

If thermostat 20 shuts off the air supply and opens the exhaust around $21^t$ chamber $31^h$ will be vented and exhaust $32^h$ will be opened. This will completely relieve diaphagm motors 9 of pressure restoring the radiators to full heating effect.

In the broader aspects of my invention I do limit myself to the use of pneumatic thermostats nor to particular structures shown, nor to the connection of two thermostats in series, as various other apparatus and connections are known to me and contemplated by me for the performance of the functions described above, in connection with a heating and ventilating unit of the direct-indirect type. It will be observed that the double effect of the heating element by direct radiation to the room and indirect or convective effect though the entering air current introduces special difficulties, and my invention is especially directed to the control of this type of heating unit. Such units if properly controlled have peculiar advantages, because they are readily installed in buildings of ordinary construction, and because each room heating and control unit is an independent entity unaffected directly or indirectly by conditions in other rooms.

The control of a plurality of automatically progressively controlled heating units by a positive master thermostat subject to room temperature is also a feature of the invention.

What is claimed is:—

1. The combination with a room to be heated and ventilated, of an air duct leading directly thereto from out of doors; a regulable heating element in said room operative in part to heat air entering through said duct and in part to heat the air in the room by direct radiation; a thermostat responsive to the temperature of the heated air discharging from said duct and connected with said heating element to regulate the same, said thermostat serving to maintain said temperature substantially constant; and a second thermostat subject to room temperature and operatively connected with said heating element, said second thermostat serving, when room temperature is sub-normal, to increase the heating effect of said element despite any regulative tendency of the first thermostat.

2. The combination with a room to be heated and ventilated, of an air duct leading thereto from out of doors; a regulable heating element in said room operative in part to heat air entering through said duct, and in part to heat the room by direct radiation, said unit normally operating at maximum effect; an intermediate type thermostat responsive to the temperature of the heated air discharging from said duct and connected with said heating element to reduce the heating effect thereof and maintain said temperature substantially constant; and a second thermostat of the positive type subject to room temperature and operatively connected with said first thermostat to render the same alternately operative and inoperative, said second thermostat rendering said first thermostat inoperative when room temperature is sub-normal.

3. The combination with a room to be heated and ventilated, of an air duct leading directly thereto from out of doors; a regulable heating element in said room operative in part to heat air entering through said duct and in part to heat the room by direct radiation, and normally acting at full heating effect; a pneumatic thermostat responsive to the temperature of the heated air discharging from said duct, and pneumatically connected with said heating element to regulate the same to maintain said temperature substantially constant; and a second thermostat subject to room temperature and controlling the supply of pneumatic pressure to said first thermostat, said second thermostat operating to cut off said supply when room temperature is sub-normal.

4. The combination with a room to be heated and ventilated, of a plurality of units each including an air duct leading directly to the room from out of doors, a regulable heating element in the room operative in part to heat air entering through the corresponding duct and in part to heat the air in the room by direct radiation, and a thermostat responsive to the temperature of the heated air discharging from said duct and connected with the corresponding heating element to regulate the same and maintain said temperature substantially constant; and a room thermostat subject to room temperature and operatively connected with said heating element, said room thermostat serving, when room temperature is sub-normal to increase the heating effects of said elements despite the regulative tendencies of said first named thermostats.

5. The combination with a room to be heated and ventilated, of a plurality of units each including an air duct leading directly to the room from out of doors, a regulable heating element in said room operative in part to heat air entering through said duct and in part to heat the room by direct radiation, said element normally operating at maximum effect, and an intermediate type thermostat responsive to the temperature of the air discharging from the corresponding duct and connected with the corresponding heating element to reduce the heating effect thereof and maintain said temperature substantially constant; and a thermostat of the positive type subject to room temperature and operatively connected with said intermediate thermostats to render them alternately operative and inoperative, said positive thermostat rendering said intermediate thermostats inoperative when the room temperature is sub-normal.

6. The combination with a room to be heated and ventilated, of a plurality of units each including an air duct leading directly to the room from out of doors, a regulable heating element in said room, operative in part to heat air entering through said duct and in part to heat the room by direct radiation, and normally acting at full heating effect, a pneumatic thermostat responsive to the temperature of the heated air discharging from the corresponding duct, and pneumatically connected with the corresponding heating element to regulate the same to maintain said temperature substantially constant; and a pneumatic thermostat of the positive type subject to room temperature and controlling the supply of pneumatic pressure to the first named thermostats, said positive thermostat serving to cut off said supply when room temperature is sub-normal.

In testimony whereof I have signed my name to this specification.

NELS HOFSTAD.